No. 695,690. Patented Mar. 18, 1902.
W. D. MACDONALD.
PHOTOGRAPHIC CAMERA.
(Application filed July 23, 1901.)
(No Model.)  2 Sheets—Sheet 1.
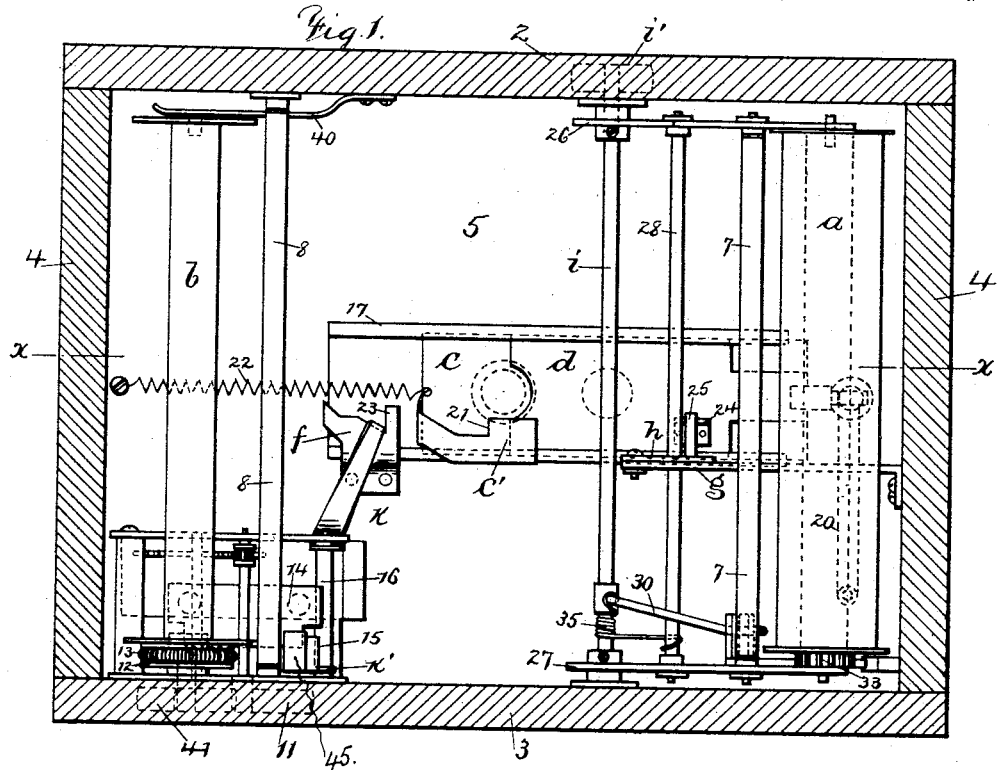
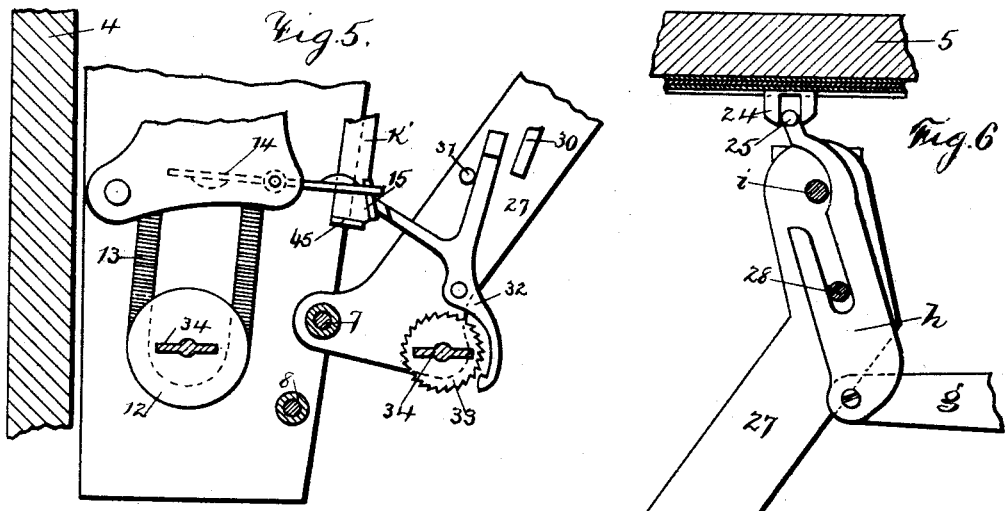
Witnesses
Inventor
W. D. Macdonald
Per L. W. Serrell & Son
Attys

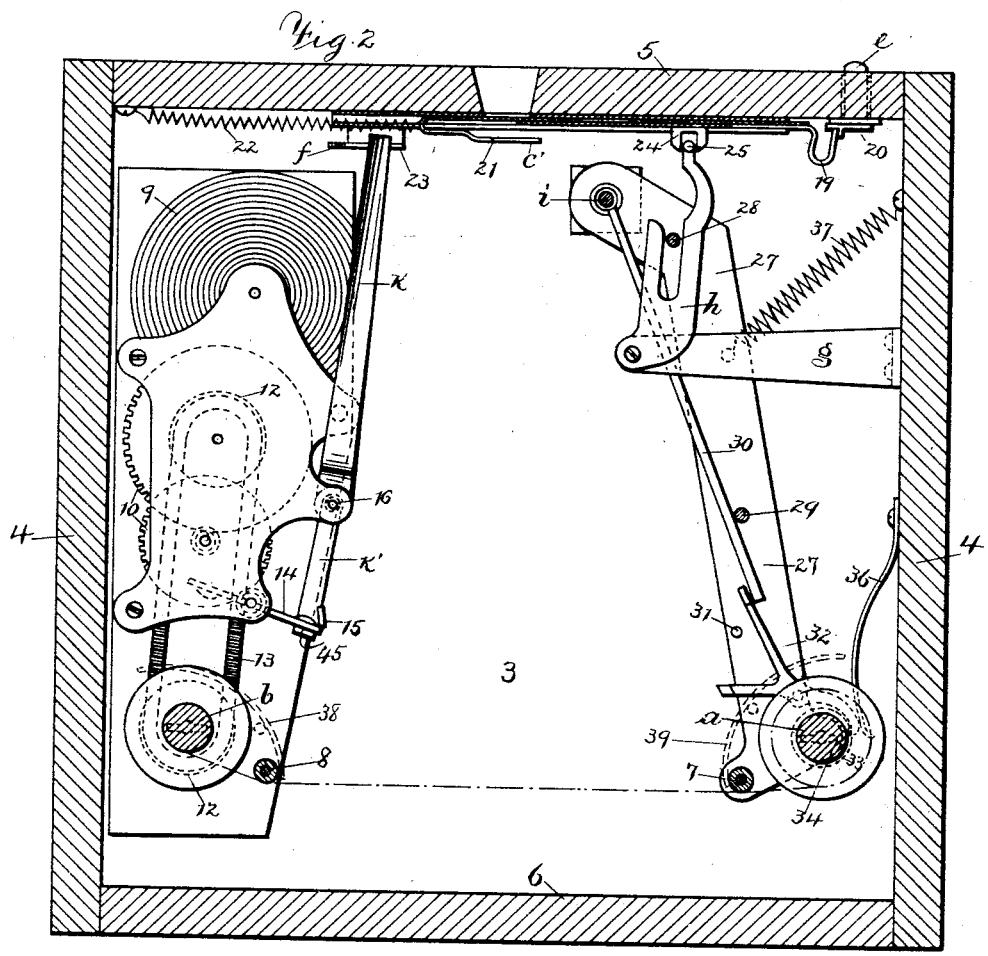

UNITED STATES PATENT OFFICE.

WILLIAM D. MACDONALD, OF NEW YORK, N. Y.

PHOTOGRAPHIC CAMERA.

SPECIFICATION forming part of Letters Patent No. 695,690, dated March 18, 1902.

Application filed July 23, 1901. Serial No. 69,366. (No model.)

*To all whom it may concern:*

Be it known that I, WILLIAM D. MACDONALD, a citizen of the United States, residing at the borough of Manhattan, in the city, county, and State of New York, have invented an Improvement in Photographic Cameras, of which the following is a specification.

In photographic cameras as heretofore constructed the devices for supporting and winding up the sensitive film have generally been separate and independent of the shutter mechanism, so that the photographer necessarily performed two operations—the first in making the exposure and the second in winding up the film preparatory to making another exposure. In actuating these devices it required thought and care to prevent making a double exposure.

The object of the present invention is to mechanically and automatically wind up the film immediately after making an exposure, to the end that successive instantaneous exposures may be made without difficulty.

In carrying out my invention the exposed film is wound upon a spool without unwinding the unexposed film, and after the exposed film has been wound upon the spool the unexposed film from the fresh spool is unwound preparatory to another exposure. I provide a spring-actuated device for positively winding up the exposed film upon the spool and for simultaneously controlling the ratio of said movement and devices actuated by the released shutter at the end of its movement for setting such winding-up devices in motion. I also provide pivoted swinging devices carrying the roll of unexposed film and which devices move with the winding up of the exposed portion of the film without the roll of unexposed film unwinding, and in such movement a plate is moved to cover the opening in the shutter and simultaneously shift the devices, releasing the winding-up mechanism for stopping the same and simultaneously effecting the release of the unexposed spool of film from a ratchet-and-pawl device holding the same, so that the swinging devices carrying the unexposed roll of film may, by a strong spring, be returned to the normal position and with such movement unwind the film and return the shutter to its original position preparatory to repeating the operations and exposing the new strip of film.

In the drawings, Figure 1 is a vertical section through the camera-box and an elevation of my improved mechanism therein contained. Fig. 2 is a sectional plan of the parts shown in Fig. 1 at about the line *x x*. Fig. 3 is a horizontal section through part of the front of the camera, showing the push-button and part of the shutter mechanism. Fig. 4 is a vertical section through part of the shutter mechanism. Fig. 5 is a sectional plan of part of the spring-actuated mechanism and part of the swinging device in the position of the parts at the end of the movement of the swinging device in one direction, and Fig. 6 is a sectional plan of the parts at the other end of the swinging device and the position of which parts corresponds to the position of the balance of the same parts shown in Fig. 5. Fig. 7 is a plan at the upper end of part of the swinging device, showing the spring for inserting the unexposed roll of film; and Fig. 8 is a partial horizontal section similar to Fig. 3, showing the position of such parts if the finger of the operator is accidentally kept upon the push-button.

The camera-box comprises the top 2, the bottom 3, sides 4, front 5, and back 6, which parts are usually made of wood and may be fastened together or be separable in any desired manner.

*a* represents the roll of unexposed film, and *b* the roll of exposed film or the spool upon which the same may be wound, the film passing over the rollers 7 and 8, between which rollers the film is stretched where the exposure takes place.

The spring-actuated device preferably comprises the coiled spring 9, a train of gears 10, pulleys 12, a flexible belt 13 around the pulleys, a governor-fan 14, and the arbors or axes for the said parts between suitable plates of metal held in position by posts of usual character, and which governor-fan 14 is preferably weighted and its lower corners notched. I provide a winding-button 11 upon the axis of the spring for applying tension thereto as frequently as may be necessary in the operation of the device. To a pivot-arbor 16, mounted between said plates, I connect release-levers *k k'*, and the free end of the lever $k'$ is upturned to form the stops 15 and 45. One stop 45 is the upturned end of the lever $k'$. The other stop 15 is adjacent and upturned from the outer edge and inclined, as shown in Figs. 2 and 5, for the reasons hereinafter described.

The shutter mechanism comprises a plate with bent edges forming slideways 17. This plate is secured upon the inner surface of the front of the camera and is provided with an opening located at the position of the lens. A shutter-plate $c$ and cover-plate $d$ are in the bent edges or slideways 17. The shutter-plate $c$ is made with an opening for the passage of the light-image in exposing the film, and the cover-plate $d$ lies upon the inner surface of the shutter-plate. The shutter-plate is provided with an opening and the cover-plate with a tooth 18, engaging the said opening, (see specially Fig. 3,) and the said cover-plate is provided with a spring-arm 19, actuated by the push-button $e$, which passes through the front of the camera. The free end of this spring-arm is adapted to come in contact with the back surface of a spring 20, secured to the inner surface of the front 5 and bearing against the back surface of the push-button to press the same forward to place, and this spring and the free end of the spring-arm 19 are adjacent to one another.

I provide a cam-arm $c'$ on the end of the shutter-plate $c$, which cam-arm $c'$ is made with a vertical edge 21, and a helical spring 22 is secured at one end to the shutter-plate and at the other end to the body of the camera, the action of said spring being to draw the said shutter-plate from the right to the left hand in making the exposure. I provide a cam-bracket $f$ and notch the upper edge so as to provide an inclined portion, a horizontal portion, and an upright end 23 at the right hand, and I provide a slotted projection 24 on the cover-plate $d$, adjacent to the right hand thereof.

The swinging device comprises a bracket $g$, secured to one side 4 of the camera, to which is pivotally connected a slotted lever $h$, the free end of the said lever $h$ being upturned, as an arm or post 25, passing into the slotted projection 24 on the cover-plate $d$. The swinging device also comprises top and bottom plates 26 27, a pivot-post $i$ in suitable bearings in the top and bottom of the camera-box and to which the said top and bottom plates are pivotally connected. Rods 28 29 extend vertically between the said top and bottom plates, and the free end of the top plate 26 is forked, as shown in Fig. 7, one end forming a connection with the upper end of the rod of the roller 7 and the other end a spring for inserting the unexposed roll of film, and I employ a turning-button $i'$ upon the upper end of the pivot-post $i$, by means of which, operated by the hand, the said pivot-post $i$ may be turned and the arm 30, connected therewith, swung. The vertical rod 28 is in the slot of the lever $h$, and the arm 30 is provided with a spring 35 around the pivot-post $i$, the action of which is to hold the said arm 30 against the vertical rod 29.

A pawl 32 is pivoted to the plate 27. This pawl is of peculiar form and provided with two arms extending in opposite directions and having upturned ends and with a toothed end engaging the ratchet 33. The edge of one of these upturned ends is beveled. This ratchet 33 is pivotally connected to the bottom plate 27, and it is provided with a key-plate 34 to pass into the lower end of the film-spool, the said key-plate being a continuation of the arbor of the ratchet. A key-plate 34 is also provided in connection with the pulley 12. I provide a stop 31 upon the bottom plate 27, against which an arm of the said pawl is adapted to bear, as in Fig. 5, so as to limit the movement of the pawl in one direction. A spring 36, secured to the inner surface of the side 4 of the camera-box, bears upon the pawl 32 in the position of the parts shown in Fig. 2, and springs 37, secured at one end to the inner surface of the box and at their other ends to the top and bottom plates 26 27, are employed for returning the swinging device to its normal position.

In the operation of the parts and supposing the roll of unexposed film $a$ to be in position in the swinging device and to be partly unrolled and extending over the rollers 7 and 8 with its end connected to the roll $b$ the operation of the camera is as follows: The push-button $e$ is pressed upon by the finger, forcing backward the spring 20 and the spring-arm 19. This removes the tooth 18 from the opening in the shutter-plate $c$, disconnecting the shutter-plate from the cover-plate and allowing the spring 22 to retract, or, in other words, to move the shutter-plate $c$ toward the left hand, so that the opening therein will pass the opening in the front of the box and the lens and give an exposure to the film, the said shutter-plate passing farther to the left, closing off the light, and the edge 21 of the cam-arm $c'$ coming against the free end of the release-lever $k$ and moving the same to the left up the incline of the cam-bracket $f$ and to the horizontal portion and so swinging the upturned ends 15 and 45 of the lever $k'$ toward the right as to release the weighted governor-fan 14 and start the spring-actuated device. This spring-actuated device, through the spring 9, the gears, the drums, and the flexible belt, causes the rotation of the roll $b$ to wind thereon the exposed portion of the film, the governor-fan 14 controlling the speed of movement in winding up the film. It will be noticed from Fig. 2 that the pawl 32 is in engagement with the ratchet 33, and that therefore the roll of unexposed film cannot unwind. Consequently the entire swinging device is drawn over bodily toward the spring-actuated device as the exposed portion of the film is wound upon the spool $b$. As the swinging device comes adjacent to or in contact with the spring-actuated device a twofold movement takes place—namely, the upturned tapering end of the pawl 32, as shown in Fig. 5, comes against the inclined stop 15 of the release-lever $k'$, swinging the lever into the path of the revolving governor-fan 14 and at the same time holding the pawl 32 in engagement with the ratchet and moving the opposite end of the lever $k$ to the right hand and upon the cam-arm $c'$. Simultaneously with the aforesaid movement and in the rotation of the said weighted fan 14 its notched edge strikes and forces the pawl-arm along the face of the inclined stop 15 before the movement of the fan 14 is arrested at the stop 45. This movement imparts to the pawl a slight turn upon its pivot sufficient to unlatch its toothed end from the ratchet 33, so as to release the roll of unexposed film and bring the springs 37 into play.

In the herein-described movement of the swinging device, as the same travels from the position Fig. 2 to the positions Figs. 5 and 6, the rod 28 moves the slotted lever $h$ from the position Fig. 2 to the position Fig. 6, and in moving the same slides the cover-plate $d$ to the left with its tooth 18 and spring 19, moving the same a sufficient distance for the tooth 18 to engage the opening in the shutter-plate $c$ and in so doing not only to connect the cover-plate and the shutter-plate, but to cover over the opening in the shutter-plate. In the further movement of the parts the springs 37 move the swinging device bodily from the positions Figs. 5 and 6 back to the normal position in Fig. 2, unwinding the unexposed film as the parts move and simultaneously and by means of the rod 28 and slotted lever $h$ return the connected shutter-plate and cover-plate into the normal position, Figs. 2 and 3, in which the free end of the spring-arm 19 bears against the back of the push-button $e$, ready to repeat the operations hereinbefore described, and as the swinging device reaches its normal position of rest, as shown in Fig. 2, the spring 36 bears against the back of the pawl 32, causing its toothed end to engage the ratchet 33 and not only to prevent the further unwinding of the roll of unexposed film, but to hold said roll during the further movement of the swinging device toward the left hand after a further exposure. When a roll of fresh film is introduced into the camera and connected to the swinging device, the paper back is partially unrolled and carried across the rollers 7 and 8 and connected to the spool or roll $b$ upon the spring-actuated device. The camera-back is then closed. It now becomes necessary to unroll the same until the first number appears at the indicator-opening usually employed in the back of the camera. This is accomplished by turning the winding-button 41 in a recess in the bottom of the camera and turning the spool or roll $b$, the forward pulley 12 meanwhile slipping in the flexible belt. In this movement the swinging device and roll of unexposed film will move toward the spring-actuated device, but the same is released by the turning-button $i'$ and arm 30, operated by hand to swing the pawl 32 and release the ratchet 33, that the said parts of the swinging device may be moved by the springs 37 to the normal position to bring the parts of the instrument into the proper position for making the first and succeeding exposures.

I have shown by dotted lines in Fig. 2 partitions or septems 38 39, which may advantageously be placed in the camera and employed for shielding the exposed portions of the film coming between the rollers 7 8 and the rolls or spools.

I have shown in Fig. 1 and prefer to employ a spring-plate 40, secured to the under surface of the top 2 of the camera-box, the free end of which spring-plate is made with a center pin to receive the upper end of the spool $b$.

In Fig. 8 I have illustrated a possible position in which the operator might thoughtlessly keep a finger on the push-button $e$ and the spring 20 be strained. In this condition as the shutter device returned to a normal set position the end of the spring-arm 19 would press against the edge of the spring 20 and yield, allowing the parts to complete their movement. Upon the release of the push-button the end of spring 19 will assume the position shown in Fig. 3.

In my improvement the mechanism is exceedingly simple and the operations are automatically progressive and the same do not require the photographer's attention, the entire mechanism and the movements thereof being effected simply by the operation of the push-button $e$.

I claim as my invention—

1. In a photographic-film camera, the combination with a shutter and means for actuating the same, and a spring-actuated device for positively winding the film from one spool onto another, of a swinging device adapted to hold and prevent the unrolling of the unexposed roll of film and move toward the spring-actuated device as the same winds up the exposed portion of the film, and means actuated by the swinging device for covering the shutter-opening and engaging the same preparatory to a return of the parts, and devices for disengaging the unexposed roll of film upon the completion of the movement of the swinging device and for returning the swinging device to its normal position and paying out the film and simultaneously returning the shutter device to a normal position preparatory to repeating the movements, substantially as set forth.

2. In a photographic-film camera, the combination with a shutter mechanism and a swinging device adapted to operate the shutter mechanism in one direction and for carrying the roll of unexposed film, of a spring-actuated device carrying a roll upon which the exposed film is wound up, and a lever device adapted at one end to be actuated and released by the movement of the shutter for releasing the said spring-actuated device at its other end and which lever device is adapted to be engaged by the aforesaid swinging device for the purpose of resetting the same and stopping the movement of the spring-actuated device, substantially as set forth.

3. In a photographic-film camera, the combination with a spring-actuated device carrying a spool upon which the exposed film is to be wound up and a swinging device carrying the roll of unexposed film, of a shutter mechanism comprising parallel adjacent plates, the one having an opening and forming the shutter-plate and the other the cover-plate, slideways in which these plates move separately or together, a spring for actuating the shutter-plate in one direction, a push-button and means actuated thereby for releasing the shutter-plate, means actuated by the movement of the shutter for releasing the spring-actuated device and means actuated by the movement of the swinging device for moving the cover-plate, engaging the shutter-plate and then moving the two plates together to a normal position, substantially as set forth.

4. In a photographic-film camera, the combination with a spring-actuated device carrying a spool upon which the exposed film is to be wound up and a swinging device carrying the roll of unexposed film, of a shutter mechanism comprising parallel adjacent plates, the one having an opening and forming the shutter-plate and the other the cover-plate, slideways in which these plates move separately or together, a spring for actuating the shutter-plate in one direction, means for releasing the shutter-plate, means for releasing the spring-actuated device, and a device connected to the shutter-plate and acting upon the said means for shifting the same, substantially as set forth.

5. In a photographic-film camera, the combination with a spring-actuated device carrying a spool upon which the exposed film is to be wound up and a swinging device carrying the roll of unexposed film, of a shutter mechanism comprising parallel adjacent plates, the one having an opening and forming the shutter-plate and the other the cover-plate, slideways in which these plates move separately or together, a spring for actuating the shutter-plate in one direction, means for releasing the shutter-plate, means for releasing the spring-actuated device, a device connected to the shutter-plate and acting upon the said means for shifting the same, and a pawl mounted upon the swinging device and holding the roll of unexposed film and adapted simultaneously to be acted upon by the spring-actuated device and to act upon the means for releasing and stopping the said spring-actuated device, substantially as set forth.

6. In a photographic-film camera, the combination with a spring-actuated device carrying a spool upon which the exposed film is to be wound up, and a swinging device carrying the roll of unexposed film, of a shutter mechanism comprising parallel adjacent plates, the one having an opening to pass the lens and give the exposure and forming the shutter-plate and also having a small opening at its opposite end, and the other forming the cover-plate and having a tooth adapted to engage the small opening of the shutter-plate whereby the two plates are held in a fixed relation to one another until released and by which the two plates may be returned together to a normal position, and means substantially as specified for actuating the said shutter and cover plates, and slideways for the said plates in the case of the camera, substantially as set forth.

7. In a photographic-film camera, the combination with slideways secured upon the inner surface of the camera, and a spring-actuated push-button $e$, of a shutter-plate $c$ having an opening for giving the exposure and a small opening at one end and a cam-arm $c'$ at the other end provided with a vertical edge 21, a cover-plate $d$ adjacent to and parallel with the shutter-plate and with the shutter-plate movable in the slideways, a spring-arm 19 at one end of the cover-plate and a tooth 18 adjacent thereto and adapted to engage the small opening of the shutter-plate, the free end of the spring-arm 19 being adapted to bear on the spring of the push-button, substantially as and for the purposes set forth.

8. In a photographic-film camera, the combination with slideways secured upon the inner surface of the camera, and a spring-actuated push-button $e$, of a shutter-plate $c$ having an opening for giving the exposure, and a small opening at one end and a cam-arm $c'$ at the other end provided with a vertical edge 21, a cover-plate $d$ adjacent to and parallel with the shutter-plate and with the shutter-plate movable in the slideways, a spring-arm 19 at one end of the cover-plate and a tooth 18 adjacent thereto and adapted to engage the small opening of the shutter-plate, the free end of the spring-arm 19 being adapted to bear on the spring of the push-button, a spring-actuated device carrying a spool upon which the exposed film is to be wound up, and a release-lever device pivoted thereto and actuated with the movement of the shutter by the cam-arm $c'$, a swinging device carrying the roll of unexposed film, a slotted projection 24 on the cover-plate $d$ and means connected therewith and with the swinging device for effecting the movement of the cover-plate in one direction and the same and the shutter-plate in the reverse direction with the movement of the swinging device, substantially as set forth.

9. In a photographic camera the combination with a spring-actuated device carrying a spool upon which the exposed film is to be wound up, a pivot-arbor 16 connected therewith, a two-part release-lever $k$ $k'$ connected to the pivot-arbor with the end of the part $k'$ upturned at 15 to form a stop for the governor of the spring-actuated device, a cam-bracket $f$ secured to the camera-box and upon which the free end of the release-lever $k$ rests, the upper edge of the cam-bracket having an inclined part, a horizontal part and an upright end, a shutter-plate, means for releasing the shutter-plate, and a spring for moving the same when released, a cam-arm attached to the shutter-plate, movable therewith and having an upright edge adapted with the movement of the shutter to come in contact with the free end of the release-lever $k$ to move the same and start the movement of the spring-actuated device, substantially as set forth.

10. In a photographic-film camera, the combination with a swinging device and a shutter mechanism, of a bracket $g$ secured to the side of the camera-case, a slotted lever $h$ pivoted thereto, a slotted projection 24 upon the shutter device and engaged by a portion of the slotted lever $h$, and a rod forming part of the swinging device and engaging the slot of the lever $h$ whereby with the movement of the swinging device the shutter mechanism is operated, substantially as set forth.

11. In a photographic-film camera, the combination with a shutter device and means for releasing the same, of a swinging device carrying the roll of unexposed film and comprising top and bottom plates, a pivot-post $i$ upon which the said plates are mounted, rods 28 29 and a roller and rod 7 connecting the said parts and forming substantially a frame, a ratchet-and-pawl device connected to the free end of the bottom plate of said frame and adapted to engage the lower end of the roll of unexposed film and hold the same, springs connected to the said swinging device and for maintaining the same in and returning the same to a normal position, substantially as set forth.

12. In a photographic-film camera, the combination with a shutter device and means for releasing the same, of a swinging device carrying the roll of unexposed film and comprising top and bottom plates, a pivot-post $i$ upon which the said plates are mounted, rods 28 29 and a roller and rod 7 connecting the said plates and forming substantially a frame, a ratchet-and-pawl device connected to the free end of the bottom plate of said frame and adapted to engage the lower end of the roll of unexposed film and hold the same, springs connected to the said swinging device and for maintaining the same in and returning the same to a normal position, and a device for releasing the said pawl to insure the unwinding of the unexposed film, and means operated by the said swinging device and connected to the shutter device for the movement of the shutter device by the swinging device, and a spring for insuring the engagement of the pawl-and-ratchet device, substantially as set forth.

13. In a photographic-film camera, the combination with a spring-actuated device carrying the spool upon which the exposed film is to be wound up, a swinging device carrying the roll of unexposed film, rollers around which the film passes, a shutter mechanism and means for actuating the same, of a release-lever device pivoted to the spring-actuated device and adapted in one position to hold the governor-fan of the spring-actuated device, means connected to the shutter device for actuating the said release-lever, a pawl-and-ratchet device connected to the swinging device for holding the roll of unexposed film in position, the said pawl device having an arm adapted to engage the said release-lever and to come in contact with the governor-fan of the spring-actuated device, substantially in the manner and for the purposes set forth.

14. In a photographic-film camera, the combination with a shutter device and means for actuating the same, and a spring-actuated device for automatically and positively winding the film as exposed onto a spool, of a swinging device in the form of a frame carrying and holding the spool of unexposed film and adapted in its movement to effect the measuring of each exposed strip of film and means for automatically releasing the said swinging device and spool of film, substantially as set forth.

15. In a photographic-film camera, the combination with a spring-actuated device for positively winding the film from one spool onto another and a device for supporting the second spool of film, and rollers over which the strip of film passes, of a finger-button connected to part of the spring-actuated device and adapted for turning the empty spool and winding thereon sufficient of the backing and film for bringing the first exposure into position, said parts slipping in their movements in connection with the spring-actuated mechanism, substantially as set forth.

16. In a photographic-film camera, the combination with a shutter device, a spring-actuated device for positively winding the film from one spool onto another and having a weighted fan with a notched edge, and a swinging device adapted to hold and having a ratchet-and-pawl device for preventing the unrolling of the unexposed roll of film, of a release-lever device pivoted to the spring-actuated device and moved in one direction by the shutter device and having upturned ends 15, one of which forms a stop for the fan and the other of which is inclined, the said spool device having an arm with an inclined end adapted to come against the inclined portion 15 to swing the release-lever device and simultaneously come in the path of the fan so that the fan may not only insure the position of the release-lever device, but unlatch the pawl device and release the ratchet so that the swinging device may be returned to its normal position, substantially as set forth.

17. In a photographic-film camera, the combination with a spring-actuated device and a swinging device acting together for positively winding the film from one spool to another, of a shutter device and means for actuating the same, a spring-arm 19 connected to the cover-plate of the shutter device, a push-button e and a spring for actuating the same, the free end of the spring-arm 19 being moved by the push-button for releasing the shutter device and the spring-arm yielding as its end comes against the push-button spring in case said parts are accidentally held by the finger of the operator, substantially as set forth.

Signed by me this 17th day of July, 1901.

W. D. MACDONALD.

Witnesses:
   GEO. T. PINCKNEY,
   S. T. HAVILAND.